United States Patent
Oshima

(10) Patent No.: US 7,816,893 B2
(45) Date of Patent: Oct. 19, 2010

(54) CONTROL APPARATUS FOR AUTOMOTIVE ALTERNATOR WITH FUNCTION OF INITIALIZATION STATE DETECTION

(75) Inventor: Kenji Oshima, Okazaki (JP)

(73) Assignee: Denso Corporation, Kariya (JP)

( * ) Notice: Subject to any disclaimer, the term of this patent is extended or adjusted under 35 U.S.C. 154(b) by 445 days.

(21) Appl. No.: 11/976,024

(22) Filed: Oct. 19, 2007

(65) Prior Publication Data

US 2008/0094039 A1 Apr. 24, 2008

(30) Foreign Application Priority Data

Oct. 24, 2006 (JP) ............... 2006-288226

(51) Int. Cl.
*H02P 11/00* (2006.01)
*H02J 7/04* (2006.01)
(52) U.S. Cl. ............... 322/28; 322/37; 322/36
(58) Field of Classification Search ........... 322/24, 322/25, 28, 36, 37, 59
See application file for complete search history.

(56) References Cited

U.S. PATENT DOCUMENTS

| 5,521,588 | A | 5/1996 | Kühner et al. | |
|---|---|---|---|---|
| 5,802,485 | A | 9/1998 | Koelle et al. | |
| 6,548,990 | B2 * | 4/2003 | Okuno et al. | 322/36 |
| 6,567,476 | B2 | 5/2003 | Kohl et al. | |
| 7,009,366 | B2 * | 3/2006 | Maehara | 322/28 |
| 7,224,148 | B2 * | 5/2007 | Watanabe et al. | 322/59 |
| 7,235,952 | B2 * | 6/2007 | Maehara | 322/24 |
| 7,294,991 | B2 * | 11/2007 | Kimura et al. | 322/37 |
| 7,405,541 | B2 * | 7/2008 | Inokuchi et al. | 322/8 |
| 7,576,520 | B2 * | 8/2009 | Maruyama et al. | 322/28 |

FOREIGN PATENT DOCUMENTS

| DE | 43 15 494 C1 | 9/1994 |
|---|---|---|
| DE | 44 40 127 A1 | 5/1996 |
| DE | 196 38 872 A1 | 3/1998 |
| DE | 103 52 033 A1 | 6/2005 |
| EP | 1 494 099 A2 | 1/2005 |
| JP | A-2004-132207 | 4/2004 |

OTHER PUBLICATIONS

"LIN Controlled Alternator Voltage Regulator," *International Rectifier* (Corporate Publication), Preliminary Data Sheet IRVR101, Sep. 2003, pp. 1-15.

(Continued)

*Primary Examiner*—Nicholas Ponomarenko
(74) *Attorney, Agent, or Firm*—Oliff & Berridge, PLC

(57) ABSTRACT

A control apparatus controls power generation of an electric generator and communicates with an external control apparatus. The control apparatus includes a receiver, a controller, an initialization state detector, and a transmitter. The receiver receives a command signal transmitted by the external control apparatus. The controller controls power generation of the electric generator according to the command signal received by the receiver. The initialization state detector detects an initialization state of the control apparatus. The transmitter transmits, when the initialization state of the control apparatus is detected by the initialization state detector, an informing signal to the external control apparatus, thereby informing the external control apparatus that the control apparatus is in the initialization state.

20 Claims, 2 Drawing Sheets

OTHER PUBLICATIONS

Mayer, "Serielle Bussysteme im Automobil-Status Quo der Steuergerate-Kommunikation [Serial Bus Systems in Automobiles—The Status Quo of Communication among Control Devices]" *Auto & Elektronik, Elektronik Industrie*, 6, 2006, pp. 70-73, (with abstract).

English language version of Office Action issued in counterpart German Patent Application.

Jun. 29, 2010 Japanese Office Action issued in Japanese Patent Application No. 2006-288226 (with translation).

* cited by examiner

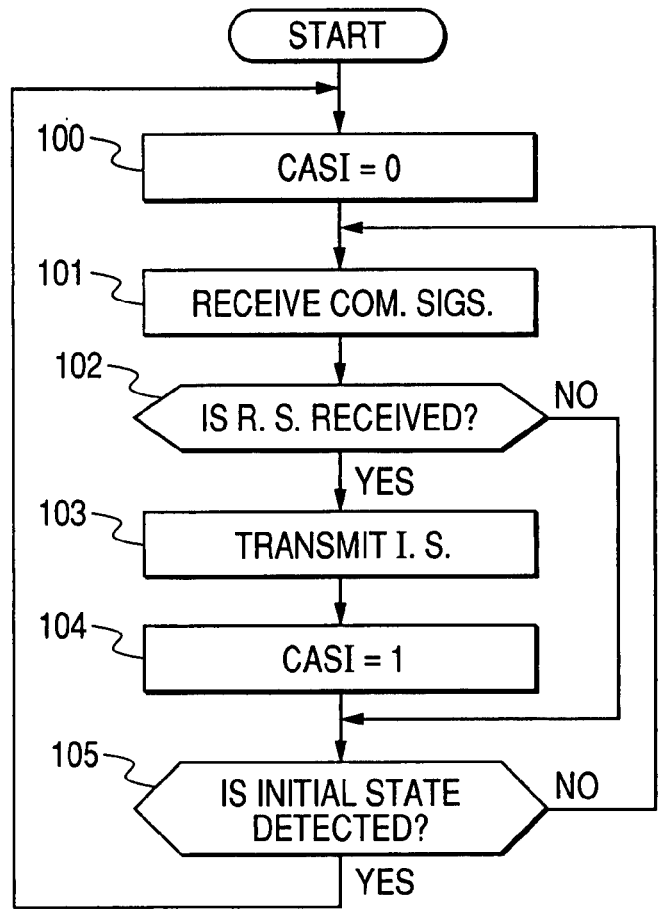

CONTROL APPARATUS FOR AUTOMOTIVE ALTERNATOR WITH FUNCTION OF INITIALIZATION STATE DETECTION

CROSS-REFERENCE TO RELATED APPLICATION

This application is based on and claims priority from Japanese Patent Application No. 2006-288226, filed on Oct. 24, 2006, the content of which is hereby incorporated by reference in its entirety into this application.

BACKGROUND OF THE INVENTION

1. Technical Field of the Invention

The present invention relates generally to control apparatus for electric generators and electric power generation systems.

More particularly, the invention relates to a control apparatus which controls power generation of an automotive alternator, communicates with a vehicle ECU (Electronic Control Unit), and has a function of detecting an initialization state of the control apparatus.

2. Description of the Related Art

A conventional control apparatus for an automotive alternator is configured to communicate with a vehicle ECU and control power generation of the alternator according to command signals transmitted from the vehicle ECU. For example, DE19638872 discloses such a control apparatus.

More specifically, the vehicle ECU transmits the command signals to the control apparatus at predetermined time intervals. Each of the command signals indicates target values of power generation control parameters, such as a target output voltage of the alternator and a target time period of gradual excitation for the alternator. Upon receiving each of the command signals, the control apparatus controls power generation of the alternator using the target values of the power generation control parameters indicated by the command signal.

Further, the control apparatus includes a memory to hold therein the target values of the power generation control parameters, which are indicated by a last-received one of the command signals, until receiving a next one of the command signals. Thus, with the memory, the control apparatus can control the alternator according to the last-received command signal until receiving the next command signal.

Furthermore, the control apparatus is electrically connected to an output terminal of the alternator, so as to be supplied with electric power necessary for operation. The output terminal of the alternator is also electrically connected to electrical loads and an automotive battery.

When the output voltage of the alternator temporarily drops below a predetermined level, for example, due to a cranking operation of an engine starter driven by the alternator or an increase in the electrical loads of the alternator, the control apparatus performs a restart operation that causes it to enter an initialization state.

In the initialization state, the memory of the control apparatus is initialized so that all the target values of the power generation control parameters stored in the memory are overwritten with corresponding default values.

Consequently, it becomes impossible for the control apparatus to control the alternator according to the last-received command signal. In other words, it becomes impossible for the control apparatus to control the alternator as commanded by the vehicle ECU.

SUMMARY OF THE INVENTION

The present invention has been made in view of the above-mentioned problems.

According to one aspect of the present invention, there is provided a control apparatus that controls power generation of an electric generator and communicates with an external control apparatus. The control apparatus includes a receiver, a controller, an initialization state detector, and a transmitter. The receiver receives a command signal transmitted by the external control apparatus. The controller controls power generation of the electric generator according to the command signal received by the receiver. The initialization state detector detects an initialization state of the control apparatus. The transmitter transmits, when the initialization state of the control apparatus is detected by the initialization state detector, an informing signal to the external control apparatus, thereby informing the external control apparatus that the control apparatus is in the initialization state.

With the above configuration, when the control apparatus enters the initialization state due to a restart operation, the initialization state detector detects the initialization state and the transmitter transmits to the external control apparatus the informing signal informative of the initialization state. Consequently, upon receiving the informing signal, the external control apparatus can be informed of the initialization state of the control apparatus and retransmit the command signal to the control apparatus. As a result, the control apparatus can continuously control power generation of the electric generator as commanded by the external control apparatus.

According to another aspect of the present invention, there is provided an electric power generation system which includes an electric generator and first and second control apparatus that communicate with each other and together control power generation of the electric generator. The first control apparatus includes a receiver, a controller, an initialization state detector, and a transmitter. The receiver receives a command signal transmitted by the second control apparatus. The controller controls power generation of the electric generator according to the command signal received by the receiver. The initialization state detector detects an initialization state of the first control apparatus. The transmitter transmits, when the initialization state of the first control apparatus is detected by the initialization state detector, an informing signal to the second control apparatus, thereby informing the second control apparatus that the first control apparatus is in the initialization state. Upon receipt of the informing signal, the second control apparatus retransmits to the first control apparatus the command signal which has been previously transmitted to the first control apparatus.

With the above configuration, even when the first control apparatus enters the initialization state due to a restart operation, it is still possible for the first control apparatus to continuously control power generation of the electric generator as commanded by the second control apparatus.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 2 is a schematic view showing the configuration of a register of the control apparatus; and FIG. 3 is a flow chart illustrating an operation of the control apparatus.

DESCRIPTION OF PREFERRED EMBODIMENT

Figure 1:
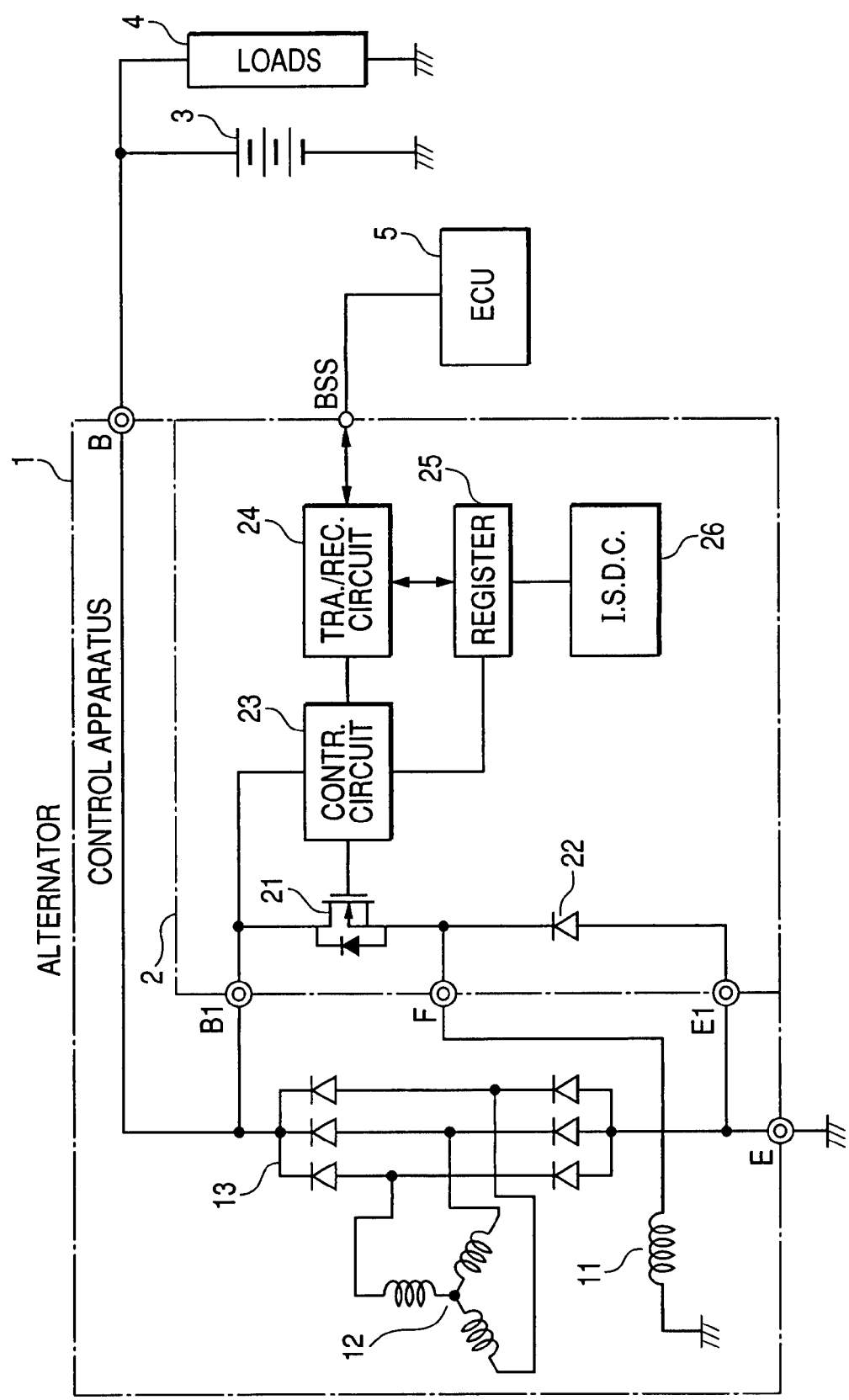
FIG. 1 is a schematic view showing the overall configuration of a control apparatus for an automotive alternator according to an embodiment of the invention.

One preferred embodiment of the present invention will be described hereinafter with reference to FIGS. 1-3.

FIG. 1 shows the overall configuration of an automotive alternator 1, which has a built-in control apparatus 2 according to the present embodiment, and its electrical connection with an automotive battery 3, electric loads 4, and a vehicle ECU (Electronic Control Unit) 5. With respect to the control apparatus 2, the vehicle ECU 5 can be considered as an external control apparatus for the alternator 1.

The alternator 1 works to charge the battery 3 and power the electric loads 4. The control apparatus 2 controls power generation of the alternator 1, so as to regulate the output voltage of the alternator 1 at an output terminal B to a target output voltage (e.g., 14 V). Both the battery 3 and the electric loads 4 are connected to the output terminal B of the alternator 1 to receive electric power.

The control apparatus 2 has an input terminal B1, a BSS (Bit Synchronized Signal) terminal, an F (Field) terminal, and an earth terminal E1. The input terminal B1 is connected to the output terminal B of the alternator 1, so as to receive the output voltage of the alternator 1. The BSS terminal is connected to the vehicle ECU 5, so that the control apparatus 2 can communicate with the vehicle ECU 5. The F terminal is connected to a field coil 11 of the alternator 1 for controlling field current supply to the field coil 11. The earth terminal E1 is connected to an earth terminal E of the alternator 1, thereby being grounded.

The alternator 1 includes, in addition to the field coil 11, a three-phase stator coil 12 and a rectification circuit 13. The field coil 11 and the stator coil 12 are respectively provided in a rotor and a stator of the alternator 1. The rectification circuit 13 is configured to full-wave rectify the three-phase AC output of the stator coil 12 to a DC output.

The control apparatus 2 includes an N-channel MOS-FET 21, a free-wheeling diode 22, a controlling circuit 23, a transmitting/receiving circuit 24, a register 25, and an initialization state detecting circuit 26 (abbreviated to I.S.D.C. in FIG. 1).

The MOS-FET 21 is connected in series with the field coil 11 of the alternator 1, so that the field coil 11 can be supplied with the field current when the MOS-FET 21 is turned on. More specifically, the MOS-FET 21 has its drain connected to the input terminal B1 and its source connected to the F terminal.

The free-wheeling diode 22 is connected in parallel with the field coil 11, so that the electric energy stored in the field coil 11 can be removed from the field coil 11 when the MOS-FET 21 is turned off. More specifically, the free-wheeling diode 22 has its cathode connected to the F terminal and its anode connected to the earth terminal E1.

The controlling circuit 23 controls on/off operation of the MOS-FET 21, thereby regulating the output voltage of the alternator 1. More specifically, the controlling circuit 23 controls the on/off operation of the MOS-FET 21 by applying a drive signal having a given duty ratio to the gate of the MOS-FET 21. Further, the controlling circuit 23 has a function of gradual excitation, by which field current can be gradually supplied to the field coil 11 to prevent rapid increase in the torque of the alternator 1. When a target time period of gradual excitation is given, the controlling circuit 23 performs the function of gradual excitation for that period.

The transmitting/receiving circuit 24 transmits and receives signals to and from the vehicle ECU 5 via the BSS terminal. The communication between the transmitting/receiving circuit 24 and the vehicle ECU 5 can be made, for example, in digital form according to the protocol of LIN, CAN, or FlexRAY.

The register 25 is composed of, for example, eight incoming-data registers and eight outgoing-data registers, as shown in FIG. 2.

In the present embodiment, the vehicle ECU 5 transmits command signals to the control apparatus 2 at predetermined time intervals. Each of the command signals indicates target values of power generation control parameters, such as a target output voltage Vt of the alternator 1, a target time period Tt of gradual excitation for the alternator 1, and target upper and lower limits DRU and DRL of the duty ratio of the drive signal to be applied to the gate of MOS-FET 21. Upon receiving each of the command signals by the transmitting/receiving circuit 24, the controlling circuit 23 controls power generation of the alternator 1 using the target values of the power generation control parameters indicated by the command signal.

The incoming-data registers of the register 25 store therein the target values of the power generation control parameters, which are indicated by a last-received one of the command signals, until receipt of a next one of the command signals. Thus, the controlling circuit 23 can control the power generation of the alternator 1 according to the last-received command signal until receipt of the next command signal.

However, when the output voltage of the alternator 1 temporarily drops below a predetermined level, for example, due to a cranking operation of an engine starter driven by the alternator 1 or an increase in the electrical loads 4 of the alternator 1, the control apparatus 2 performs a restart operation that causes it to enter an initialization state.

In the initialization state, the register 25 is initialized so that all the target values of the power generation control parameters stored in the incoming-data register of the register 25 are overwritten with corresponding default values.

The outgoing-data registers of the register 25 store therein data that are to be transmitted by the transmitting/receiving circuit 24 to the vehicle ECU 5. Those data include actual values of at least part of the power generation control parameters, such as an actual output voltage Va of the alternator 1 and an actual time period Ta of gradual excitation for the alternator 1, and the value of a control apparatus state indicator CASI.

Here, the control apparatus state indicator CASI is used to indicate whether the control apparatus 2 is in the initialization state. More specifically, in the present embodiment, the value 0 of CASI indicates that the control apparatus 2 is in the initialization state and the value 1 of CASI indicates that it is not.

The initialization state detecting circuit 26 detects whether the control apparatus 2 is in the initialization state. More specifically, in the present embodiment, the initialization state detecting circuit 26 monitors at least part of the data stored in the incoming-data registers of the register 25, and determines that the control apparatus 2 is in the initialization state when the monitored data coincide with the respective default values.

When the initialization state of the control apparatus 2 is detected by the initialization state detecting circuit 26, the value of the control apparatus state indicator CASI is set to 0 in the corresponding outgoing-data register of the register 25.

The control apparatus 2 enters the initialization state after a start operation, which follows a turning-on operation of a key switch (not shown) of the vehicle, or when there is a restart operation as described previously.

After having described the overall configuration of the control apparatus 2, operation thereof will be descried hereinafter with reference to FIG. 3.

When the control apparatus 2 starts the operation following a turning-on operation of the key switch, the register 25 is initialized so that all the target values of the power generation control parameters are set to the corresponding default values in the incoming-data register of the register 25.

Then, the initialization state detecting circuit 26 detects the initialization state of the control apparatus 2, and thus the value of the control apparatus state indicator CASI is set to 0 in the corresponding outgoing-data register of the register 25, as indicated at step 100.

After that, the transmitting/receiving circuit 24 receives command signals transmitted by the vehicle ECU 5, as indicated at step 101.

Upon receipt of each of the command signals, the target values of the power generation control parameters indicated by the command signal are stored in the corresponding incoming-data registers of the register 25. Further, the controlling circuit 23 controls the on/off operation of the MOSFET 21 by using the target values of the power generation control parameters stored in the incoming-data registers.

Meanwhile, the transmitting/receiving circuit 24 checks whether there is a request signal (abbreviated to R. S. in FIG. 3) transmitted by the vehicle ECU 5, as indicated at step 102.

The request signal indicates a request for the transmitting/receiving circuit 24 to transmit an informing signal (abbreviated to I. S. in FIG. 3). The informing signal indicates the value of the control apparatus state indicator CASI stored in the register 25, in other words, indicates whether the control apparatus 2 is in the initialization state.

If the check at step 102 produces a "YES" answer, then the transmitting/receiving circuit 24 transmits the informing signal to the vehicle ECU 5, as indicated at step 103.

Upon receiving the informing signal, the vehicle ECU 5 determines whether the control apparatus 2 is in the initialization state based on the value of CASI indicated by the informing signal, and retransmits the last-transmitted command signal to the control apparatus 2 when the control apparatus 2 is determined to be in the initialization state.

After transmission of the informing signal at step 103, the value of CASI is set to 1 in the corresponding outgoing-data register of the register 25, as indicated at step 104.

On the other hand, if the check at step 102 produces a "NO" answer, then the operation directly proceeds to step 105.

At step 105, the initialization state detecting circuit 26 detects whether the control apparatus 2 is in the initialization state in the manner as described above.

If the control apparatus 2 is detected to be in the initialization state, then the operation returns to step 100. Otherwise, the operation returns to step 101.

In the present embodiment, the vehicle ECU 5 cyclically transmits the request signal at shorter time intervals than it transmits the command signals. Moreover, though not shown in FIG. 3, the control apparatus 2 also transmits to the vehicle ECU 5 the other data stored in the outgoing-data registers of the register 25 through the informing signal or other different signals.

The above-described control apparatus 2 according to the present embodiment has the following advantages.

When the control apparatus 2 enters the initialization state due to a restart operation, the initialization state detecting circuit 26 detects the initialization state and the transmitting/receiving circuit 24 transmits to the vehicle ECU 5 the informing signal informative of the initialization state.

Consequently, upon receiving the informing signal, the vehicle ECU 5 can be informed of the initialization state of the control apparatus 2 and retransmit the last-transmitted command signal to the control apparatus 2. As a result, the control apparatus 2 can continuously control power generation of the alternator 1 as commanded by the vehicle ECU 5.

Further, the initialization state detecting circuit 26 monitors at least part of the data stored in the incoming-data registers of the register 25, and determines that the control apparatus 2 is in the initialization state when the monitored data coincide with the respective default values.

Consequently, with the above configuration, the initialization state detecting circuit 26 can easily and reliably detect the initialization state of the control apparatus 2.

Furthermore, when the control apparatus 2 is detected to be in the initialization state, the value of the control apparatus state indicator CASI is first set to 0 in the register 25 and is then set to 1 after transmission of the informing signal to the vehicle ECU 5.

With the above configuration, it is possible to prevent the control apparatus 2 from misinforming the vehicle ECU 5 of the initialization state after its recovery from the initialization state. In other words, it is possible for the control apparatus 2 to reliably inform the vehicle ECU 5 of the initialization state.

Moreover, the transmitting/receiving circuit 24 transmits the informing signal to the vehicle ECU 5 only upon receipt of the request signal transmitted by the vehicle ECU 5.

With this configuration, the transmitting/receiving circuit 24 can transmit the informing signal according to the operating condition of the vehicle ECU 5. Especially, when there are a number of devices communicating with the vehicle ECU 5, it is possible to simplify the communication between the vehicle ECU 5 and those devices.

Furthermore, the vehicle ECU 5 cyclically transmits the request signal at shorter time intervals than it transmits the command signals.

With this configuration, it is possible for the control apparatus 2 to inform the vehicle ECU 5 of the initial sate thereof in a timely manner.

While the above particular embodiment of the present invention has been shown and described, it will be understood by those skilled in the art that various modifications, changes, and improvements may be made without departing from the spirit of the invention.

For example, in the previous embodiment, the control apparatus 2 is configured to transmit the informing signal only upon receipt of the request signal from the vehicle ECU 5.

However, the control apparatus 2 also can be configured to transmit the informing signal immediately after detection of the initialization state, without receiving a request signal from the vehicle ECU 5.

With this configuration, it is possible for the control apparatus 2 to inform the vehicle ECU 5 of the initialization state thereof in an even more timely manner.

Moreover, in the previous embodiment, each of the command signals indicates a set of target values of the power generation control parameters. In other words, the target values of the power generation control parameters are transmitted from the vehicle ECU 5 to the control apparatus 2 through the same command signal and thus at the same time.

However, the target values of the power generation control parameters also can be transmitted from the vehicle ECU 5 to the control apparatus 2 through different kinds of command signals and thus at different times.

Furthermore, although the previous embodiment is directed to the control apparatus 2 that controls power generation of the automotive alternator 1, the invention also can be applied to other control apparatus for electric generators and electric power generation systems.

What is claimed is:

1. A control apparatus which controls power generation of an electric generator and communicates with an external control apparatus, the control apparatus comprising:
    a receiver that receives a command signal transmitted by the external control apparatus;
    a controller that controls power generation of the electric generator according to the command signal received by the receiver;
    an initialization state detector that detects an initialization state of the control apparatus; and
    a transmitter that transmits, when the initialization state of the control apparatus is detected by the initialization state detector, an informing signal to the external control apparatus, thereby informing the external control apparatus that the control apparatus is in the initialization state.

2. The control apparatus as set forth in claim 1, wherein the command signal indicates at least a target value of a power generation control parameter.

3. The control apparatus as set forth in claim 2, further comprising a command signal memory that stores the target value of the power generation control parameter indicated by the command signal,
    wherein in the initialization state of the control apparatus, the target value of the power generation control parameter is initialized in the command signal memory to have a default value.

4. The control apparatus as set forth in claim 3, wherein the initialization state detector monitors the target value of the power generation control parameter stored in the command signal memory, and determines that the control apparatus is in the initialization state when the target value is initialized to have the default value.

5. The control apparatus as set forth in claim 2, wherein the power generation control parameter is an output voltage of the electric generator.

6. The control apparatus as set forth in claim 2, wherein the power generation control parameter is a time period of gradual excitation for the electric generator.

7. The control apparatus as set forth in claim 1, wherein the informing signal indicates a first value of a control apparatus state indicator when the initialization state of the control apparatus is detected by the initialization state detector,
    the control apparatus further comprises an informing signal memory that stores the first value of the control apparatus state indicator when the initialization state of the control apparatus is detected by the initialization state detector, and
    after transmission of the informing signal by the transmitter to the external control apparatus, the first value of the control apparatus state indicator stored in the informing signal memory is overwritten with a second value of the control apparatus state indicator.

8. The control apparatus as set forth in claim 1, wherein the transmitter transmits the informing signal upon receipt, by the receiver, of a request signal transmitted by the external control apparatus.

9. The control apparatus as set forth in claim 8, wherein the external control apparatus transmits a plurality of command signals at predetermined time intervals,
    upon receipt of each of the command signals by the receiver, the controller controls power generation of the electric generator according to the command signal, and
    the external control apparatus cyclically transmits the request signal at shorter time intervals than it transmits the command signals.

10. The control apparatus as set forth in claim 1, wherein the electric generator is a vehicular alternator, and the control apparatus is a voltage regulator that regulates an output voltage of the vehicle alternator.

11. An electric power generation system comprising:
    an electric generator; and
    first and second control apparatus that communicate with each other and together control power generation of the electric generator,
    wherein the first control apparatus comprises:
    a receiver that receives a command signal transmitted by the second control apparatus;
    a controller that controls power generation of the electric generator according to the command signal received by the receiver;
    an initialization state detector that detects an initialization state of the first control apparatus; and
    a transmitter that transmits, when the initialization state of the first control apparatus is detected by the initialization state detector, an informing signal to the second control apparatus, thereby informing the second control apparatus that the first control apparatus is in the initialization state, and
    wherein upon receipt of the informing signal, the second control apparatus retransmits to the first control apparatus the command signal which has been previously transmitted to the first control apparatus.

12. The electric power generation system as set forth in claim 11, wherein the command signal indicates at least a target value of a power generation control parameter.

13. The electric power generation system as set forth in claim 12, wherein the first control apparatus further comprises a command signal memory that stores the target value of the power generation control parameter indicated by the command signal, and wherein in the initialization state of the first control apparatus, the target value of the power generation control parameter is initialized in the command signal memory to have a default value.

14. The electric power generation system as set forth in claim 13, wherein the initialization state detector of the first control apparatus monitors the target value of the power generation control parameter stored in the command signal memory, and determines that the first control apparatus is in the initialization state when the target value is initialized to have the default value.

15. The electric power generation system as set forth in claim 12, wherein the power generation control parameter is an output voltage of the electric generator.

16. The electric power generation system as set forth in claim 12, wherein the power generation control parameter is a time period of gradual excitation for the electric generator.

17. The electric power generation system as set forth in claim 11, wherein the informing signal indicates a first value of a control apparatus state indicator when the initialization state of the first control apparatus is detected by the initialization state detector,
    the first control apparatus further comprises an informing signal memory that stores the first value of the control apparatus state indicator when the initialization state of the first control apparatus is detected by the initialization state detector, and after transmission of the informing signal by the transmitter of the first control apparatus to the second control apparatus, the first value of the control apparatus state indicator stored in the informing signal memory is overwritten with a second value of the control apparatus state indicator.

18. The electric power generation system as set forth in claim 11, wherein the transmitter of the first control apparatus transmits the informing signal upon receipt, by the receiver of the first control apparatus, of a request signal transmitted by the second control apparatus.

19. The electric power generation system as set forth in claim 18, wherein the second control apparatus transmits a plurality of command signals at predetermined time intervals, upon receipt of each of the command signals by the receiver of the first control apparatus, the controller of the first control apparatus controls power generation of the electric generator according to the command signal, and the second control apparatus cyclically transmits the request signal at shorter time intervals than it transmits the command signals.

20. The electric power generation system as set forth in claim 11, wherein the electric power generation system is configured for use in a vehicle.

* * * * *